United States Patent
Yu et al.

(10) Patent No.: US 7,898,611 B2
(45) Date of Patent: Mar. 1, 2011

(54) LIQUID CRYSTAL DISPLAY COMPRISING A FLEXIBLE PRINTED CIRCUIT WITH GROUNDING MEMBERS

(75) Inventors: Ming-Chiang Yu, Miao-Li (TW); Yu-Chih Hsieh, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 1106 days.

(21) Appl. No.: 11/641,461

(22) Filed: Dec. 19, 2006

(65) Prior Publication Data

US 2007/0146570 A1    Jun. 28, 2007

(30) Foreign Application Priority Data

Dec. 23, 2005    (TW) ................................ 94146372 A

(51) Int. Cl.
  *G02F 1/1333*    (2006.01)
(52) U.S. Cl. .............. 349/58; 349/150; 349/65; 362/633
(58) Field of Classification Search .................. 349/150, 349/65, 58, 149; 362/631–634; 361/749, 361/816; 439/67, 77, 92
See application file for complete search history.

(56) References Cited

U.S. PATENT DOCUMENTS

| | | | |
|---|---|---|---|
| 6,342,933 B1 | 1/2002 | Nakamura et al. | |
| 6,490,016 B1 | 12/2002 | Koura | |
| 6,534,722 B2 * | 3/2003 | Takaoka | ........................ 174/254 |
| 6,556,268 B1 | 4/2003 | Lee et al. | |
| 7,535,173 B2 | 5/2009 | Kim | |
| 7,630,023 B2 * | 12/2009 | Jee et al. | ........................ 349/58 |
| 2004/0169782 A1 | 9/2004 | Lai et al. | |

FOREIGN PATENT DOCUMENTS

| | | |
|---|---|---|
| CN | 1609921 A | 4/2005 |
| JP | P2005-55512 A | 3/2005 |
| TW | 507100 B | 10/2002 |

* cited by examiner

*Primary Examiner* — Thoi V Duong
(74) *Attorney, Agent, or Firm* — Wei Te Chung

(57) ABSTRACT

An exemplary liquid crystal display (20) includes a liquid crystal panel (22), a flexible printed circuit (23) connected to the liquid crystal panel, and a backlight module (25) configured for illuminating the liquid crystal panel. The flexible printed circuit includes a first grounding member (231). The backlight module includes a metal frame (28). The metal frame includes a first holding member (281). The first holding member of the metal frame holds the first grounding member of the flexible printed circuit such that the first grounding member is electrically connected with the metal frame.

12 Claims, 4 Drawing Sheets

LIQUID CRYSTAL DISPLAY COMPRISING A FLEXIBLE PRINTED CIRCUIT WITH GROUNDING MEMBERS

FIELD OF THE INVENTION

The present invention relates to a liquid crystal display which includes a flexible printed circuit and a metal frame, the flexible printed circuit having a grounding member, and the metal frame having a holding member for holding the grounding member.

GENERAL BACKGROUND

A typical liquid crystal display is capable of displaying a clear and sharp image through thousands or even millions of pixels that make up the complete image. The liquid crystal display has thus been applied to various electronic equipment in which messages or pictures need to be displayed, such as mobile phones and notebook computers. However, liquid crystal in the liquid crystal display does not itself emit light. Rather, the liquid crystal has to be lit up by a light source so as to clearly and sharply display text and images. The light source may be ambient light, or a backlight module attached to the liquid crystal display.

Referring to FIGS. 4 and 5, a typical liquid crystal display is shown. The liquid crystal display 10 includes a liquid crystal panel 12, a flexible printed circuit (FPC) 13, and a backlight source 15. The FPC 13 is electrically connected to the liquid crystal panel 12, and provides display signals to the liquid crystal panel 12. The backlight module 15 is located adjacent to the liquid crystal panel 12, and is configured for illuminating the liquid crystal panel 12. The backlight module 15 includes a plastic frame 17 and a metal frame 18. The plastic frame 17 and the metal frame 18 are locked together to accommodate the liquid crystal panel 12 and other components of the backlight module 15.

The FPC 13 includes a grounding member 133. The grounding member 133 has a plurality of ends of grounding wires (not shown) of the FPC 13 gathered thereon. When the liquid crystal display 10 is assembled, the FPC 13 is bent to attach on a back side (not labeled) of the metal frame 18 of the backlight module 15. The grounding member 133 of the FPC 13 is pasted on the metal frame 18 by a conductive film 19 such that the grounding member 133 is grounded via the metal frame 18. Thus, electromagnetic interference (EMI) of the liquid crystal display 10 is eliminated.

However, the adhesive strength of the conductive film 19 is prone to wane over time. In addition, parts of the conductive film 19 are liable to be chipped off or break off, particular if the liquid crystal display 10 is jarred and if the conductive film 19 is aged. For these kinds of reasons, the resistance between the FPC 13 and the metal frame 18 may be unduly increased, and the capability of the liquid crystal display 10 to resist EMI may be diminished. If the liquid crystal display 10 is prone to EMI, it may not operate reliably.

Therefore, a new liquid crystal display that can overcome the above-described problems is desired.

SUMMARY

In one preferred embodiment, a liquid crystal display includes a liquid crystal panel, a flexible printed circuit connected to the liquid crystal panel, and a backlight module configured for illuminating the liquid crystal panel. The flexible printed circuit includes a first grounding member. The backlight module includes a metal frame. The metal frame includes a first holding member. The first holding member of the metal frame holds the first grounding member of the flexible printed circuit such that the first grounding member is electrically connected with the metal frame.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
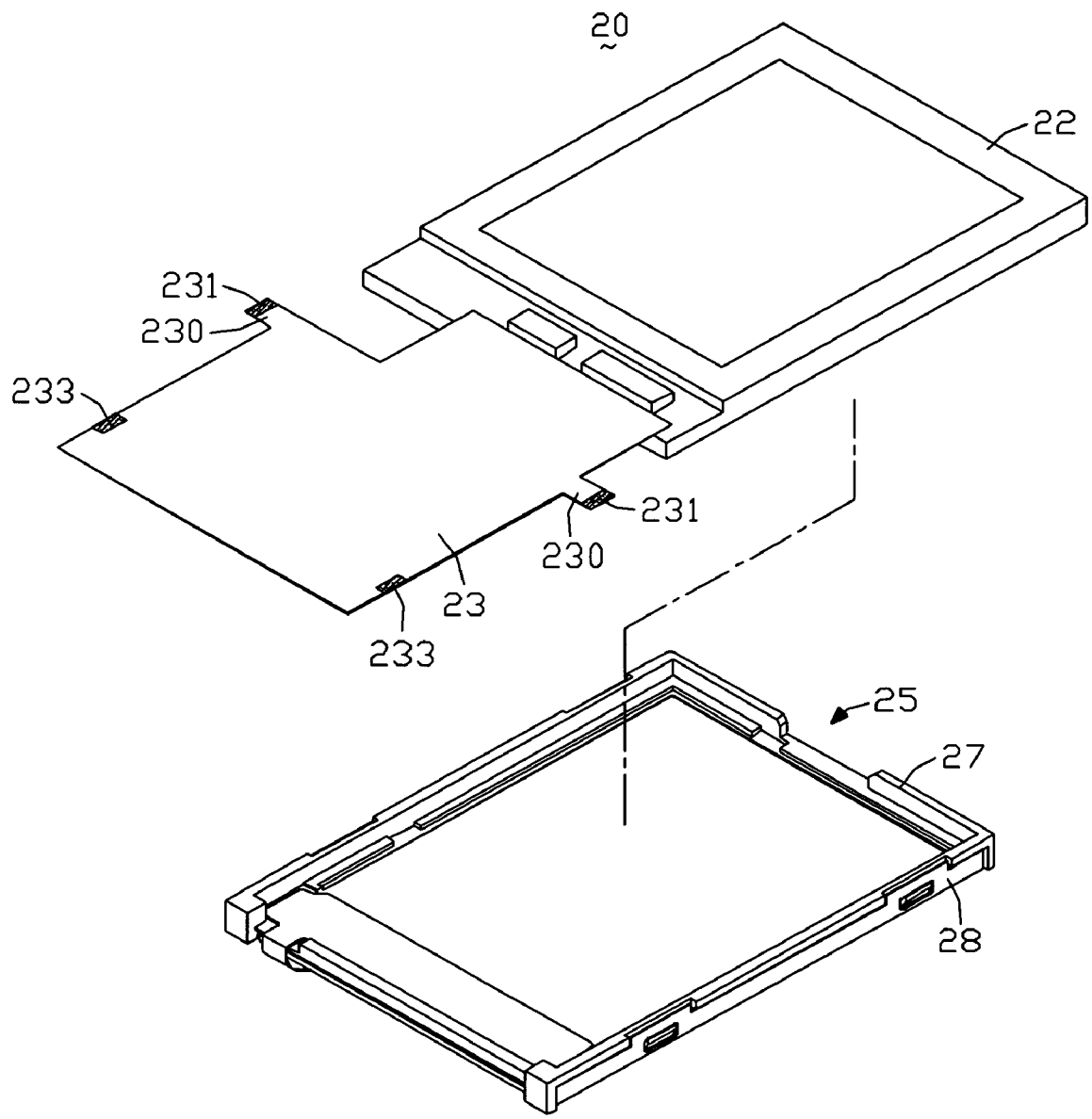
FIG. 1 is an exploded, isometric view of a liquid crystal display according to an exemplary embodiment of the present invention, the liquid crystal display including a liquid crystal panel and a flexible printed circuit.
Figure 2:
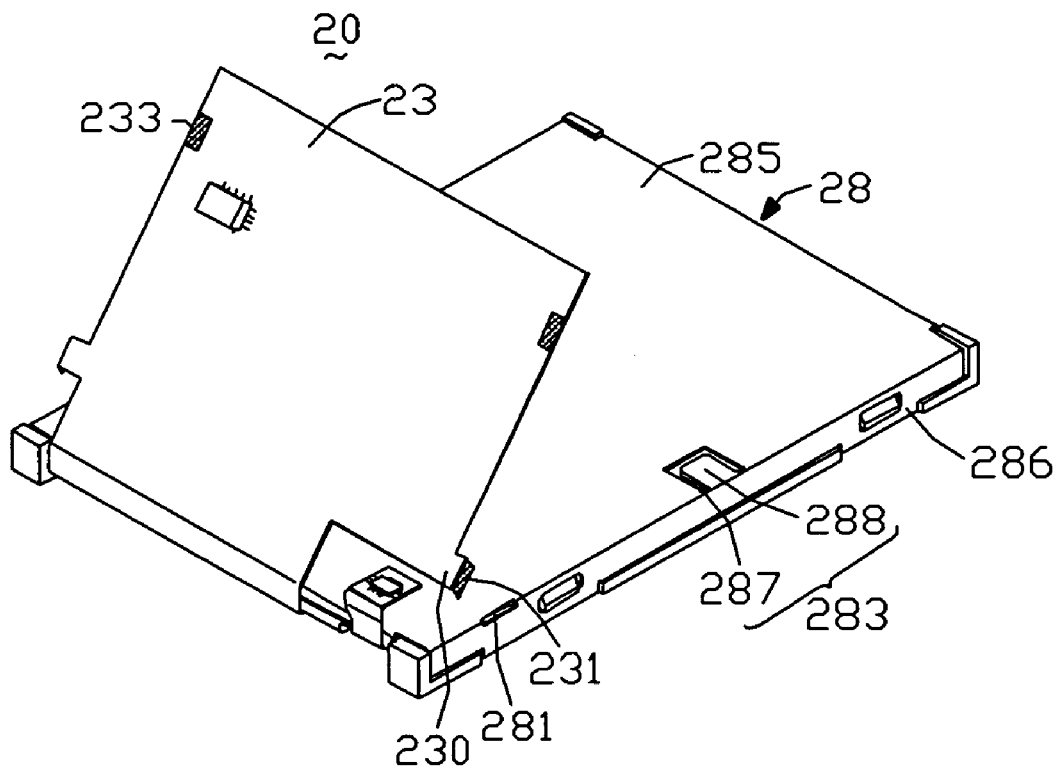
FIG. 2 is an inverted, isometric view of the liquid crystal display of the exemplary embodiment, showing the flexible printed circuit in the process of being bent in order for it to be attached to the liquid crystal panel.
Figure 3:
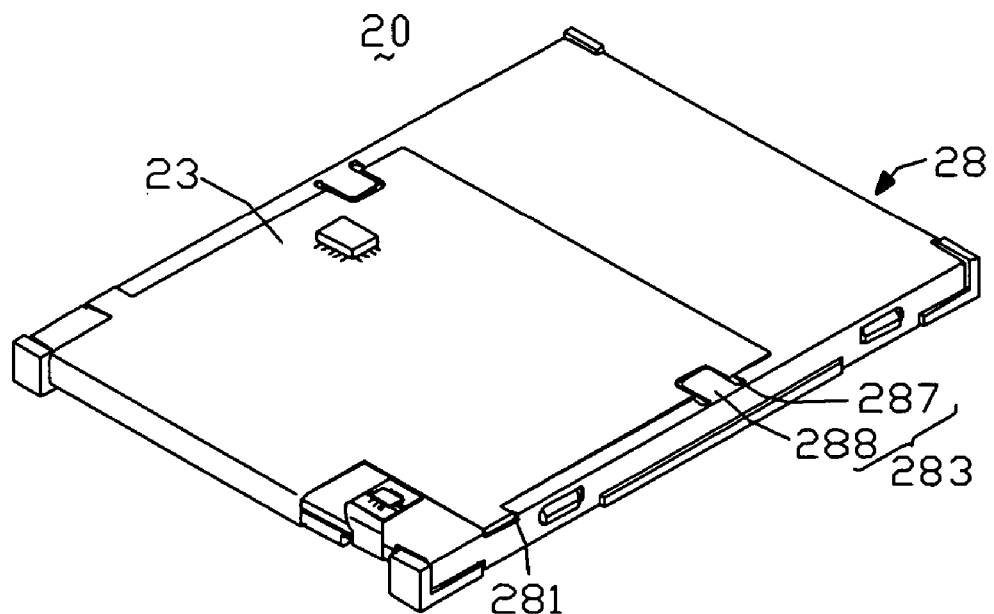
FIG. 3 is similar to FIG. 2, but showing the flexible printed circuit duly attached to the liquid crystal panel.
Figure 4:
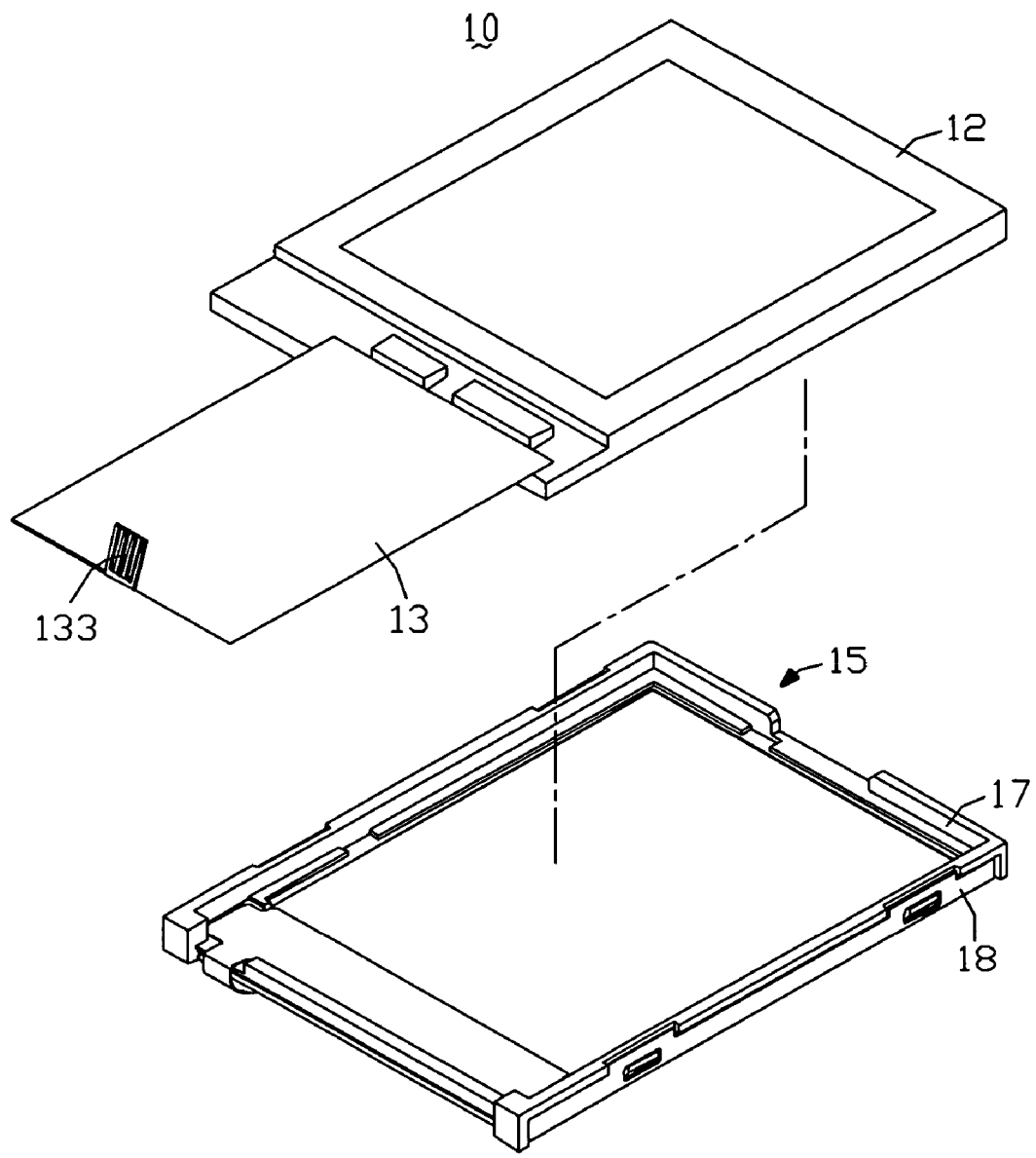
FIG. 4 is an exploded, isometric view of a conventional liquid crystal display, the liquid crystal display including a liquid crystal panel and a flexible printed circuit.
Figure 5:
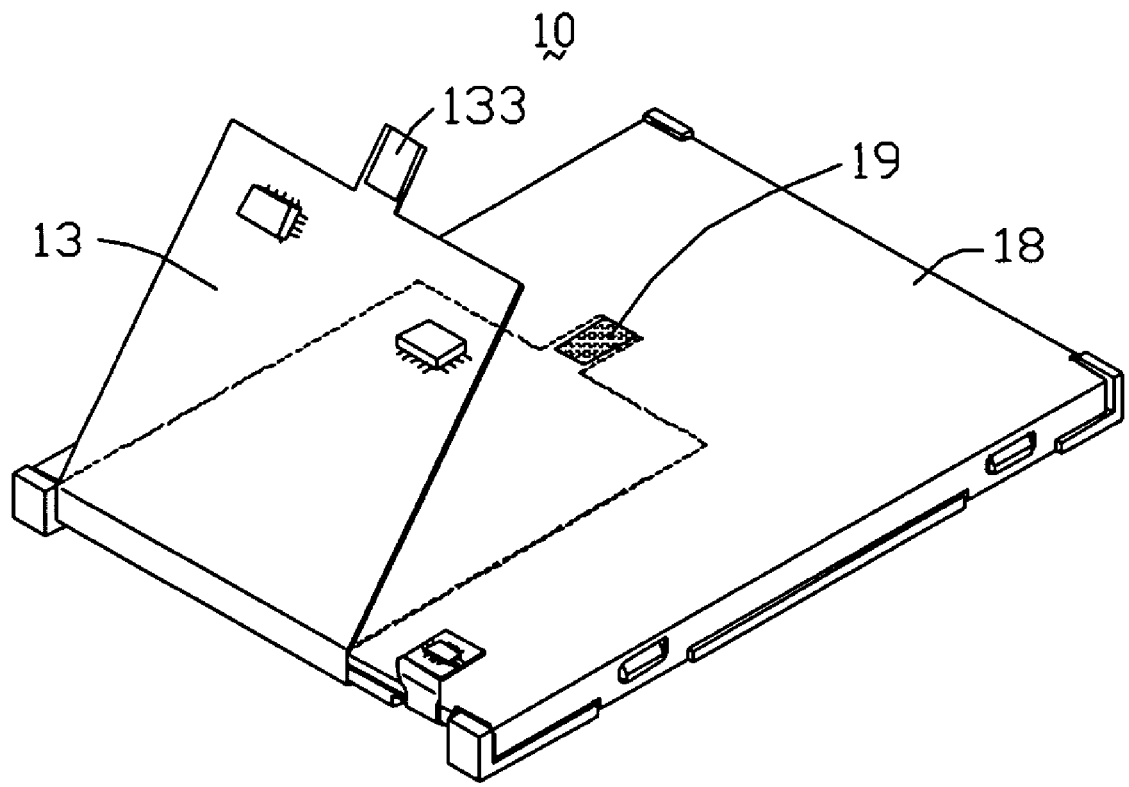
FIG. 5 is an inverted, isometric view of the liquid crystal display of FIG. 4, showing the flexible printed circuit (solid lines) in the process of being bent in order for it to be attached to the liquid crystal panel, and showing the flexible printed circuit (dashed lines) duly attached to the liquid crystal panel.

Referring to FIGS. 1, 2 and 3, a liquid crystal display according to an exemplary embodiment of the present invention is shown. The liquid crystal display 20 includes a liquid crystal panel 22, flexible printed circuit (FPC) 23, and a backlight source 25. The FPC 23 is electrically connected to the liquid crystal panel 22, and provides display signals to the liquid crystal panel 22. The backlight module 25 is located adjacent to the liquid crystal panel 22, and is configured for illuminating the liquid crystal panel 22. The backlight module 25 includes a plastic frame 27 and a metal frame 28. The plastic frame 27 and the metal frame 28 are locked together to accommodate the liquid crystal panel 22 and other components of the backlight module 25. The metal frame 28 can be made from copper, aluminum, or iron.

The FPC 23 includes two extending portions 230, two first grounding members 231, and two second grounding members 233. The extending portions 230 outwardly extend from two opposite free edges (not labeled) of the FPC 23, respectively. The first grounding members 231 are located at free ends of the extending portions 230, respectively. The second grounding members 233 are respectively located at the two opposite free edges of the FPC 23, and are distal from the extending portions 230.

The metal frame 28 includes a bottom plate 285, two opposite sidewalls 286, two first holding members 281, and two second holding members 283. The sidewalls 286 are substantially perpendicularly connected with the bottom plate 285. The first holding members 281 comprise slender notches respectively defined at two junctions (not labeled) between the sidewalls 286 and the bottom plate 285. The first holding members 281 respectively correspond to the extending portions 230 of the FPC 23. The second holding members 283 are respectively defined at two opposite edges of the bottom plate 285 adjacent the sidewalls 286, and correspond to the second grounding members 233 of the FPC 23. Each of the second holding members 283 includes a U-shaped slot 287, and a rectangular elastic tab 288 formed as a result of the formation of the U-shaped slot 287.

When the liquid crystal display 20 is assembled, the FPC 23 is attached to the bottom plate 285 of the metal frame 28. The extending portions 230 are received in the first holding members 281 after being bent. The first grounding members 231 contact the metal frame 28 due to the resilience force of the extending portions 230, thus achieving grounding. The second grounding members 233 are inserted beneath the elastic tabs 288, and contact the elastic tabs 288 of the metal frame 28, thus achieving grounding.

In summary, the grounding members 231, 233 of the FPC 23 respectively cooperate with the holding members 281, 183 to connect the grounding wires of the liquid crystal display 20 to ground. This grounding configuration is achieved by elastic and mechanical interengagement. Unlike conventional art, there is no reliance on a conductive film. Thus, the liquid crystal display 20 has high reliability.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
   a liquid crystal panel;
   a flexible printed circuit connected to the liquid crystal panel, the flexible printed circuit comprising a first grounding member and a second grounding member; and
   a backlight module configured for illuminating the liquid crystal panel, the backlight module comprising a metal frame, the metal frame comprising a first holding member, a bottom plate, and a second holding member;
   wherein the first holding member of the metal frame holds the first grounding member of the flexible printed circuit such that the first grounding member is electrically connected with the metal frame, the second holding member holds the second grounding member to electrically connect the second grounding member with the metal frame, and the second holding member is located at an edge of the flexible printed circuit and comprises a U-shaped slot defined at the bottom plate, and an elastic tab defined by the U-shaped slot.

2. The liquid crystal display as claimed in claim 1, wherein the flexible printed circuit further comprises an extending portion outwardly extending from a free edge thereof and the first grounding member is located at a free end of the extending portion.

3. The liquid crystal display as claimed in claim 2, wherein the metal frame further comprises a sidewall substantially perpendicularly connected with the bottom plate.

4. The liquid crystal display as claimed in claim 3, wherein the first holding member comprises a notch defined at a joint between the bottom plate and the sidewall.

5. The liquid crystal display as claimed in claim 4, wherein the extending portion is bent from the free edge of the flexible printed circuit and received in the notch, and the first grounding member contacts the metal frame and is thereby electrically connected to the metal frame.

6. The liquid crystal display as claimed in claim 1, wherein the second grounding member contacts an inner side of the elastic tab of the second holding member and is thereby connected to the metal frame.

7. The liquid crystal display as claimed in claim 1, wherein the metal frame is made from material selected from the group consisting of copper, aluminum, and iron.

8. A liquid crystal display comprising:
   a liquid crystal panel;
   a flexible printed circuit connected to the liquid crystal panel, the flexible printed circuit comprising a grounding member; and
   a backlight module configured for illuminating the liquid crystal panel, the backlight module comprising a metal frame, the metal frame comprising a bottom plane and at least one holding member thereon;
   wherein the at least one holding member of the metal frame engages the grounding member of the flexible printed circuit such that the grounding member is electrically connected with the metal frame,
   wherein the at least one holding member comprises a U-shaped slot defined at the bottom plate, and an elastic tab defined by the U-shaped slot, and the grounding member contacts an inner side of the elastic tab of the holding member and is thereby connected to the metal frame.

9. The liquid crystal display as claimed in claim 8, wherein the grounding member is located at an edge of the flexible printed circuit.

10. The liquid crystal display as claimed in claim 8, wherein the metal frame is made from material selected from the group consisting of copper, aluminum, and iron.

11. A liquid crystal display comprising:
    a liquid crystal panel;
    a flexible printed circuit connected to the liquid crystal panel, the flexible printed circuit comprising a grounding member; and
    a backlight module comprising a metal plate, the metal plate comprising a bottom plane defining an opening and an elastic tab extending from an edge of the bottom plane and toward the opening;
    wherein the flexible printed circuit is bent to be attached to the metal plate, the grounding member contacting the elastic tab for achieving grounding and clasped by the bottom plane and the elastic tab.

12. The liquid crystal display as claimed in claim 11, wherein the flexible printed circuit further comprises another grounding member, the metal plate defines a notch at an edge of the bottom plane, the another grounding member is inserted into the notch after being bent and contacts the metal plate.

* * * * *

UNITED STATES PATENT AND TRADEMARK OFFICE
CERTIFICATE OF CORRECTION

PATENT NO. : 7,898,611 B2  
APPLICATION NO. : 11/641461  
DATED : March 1, 2011  
INVENTOR(S) : Ming-Chiang Yu et al.

Page 1 of 1

It is certified that error appears in the above-identified patent and that said Letters Patent is hereby corrected as shown below:

On the title page item (73) "Assignees" on the front page of the Patent should read:

(73) Assignees: Chimei Innolux Corporation, Miao-Li County (TW).

Signed and Sealed this
Seventh Day of June, 2011

David J. Kappos
*Director of the United States Patent and Trademark Office*